(12) United States Patent
Sonoda

(10) Patent No.: US 9,471,055 B2
(45) Date of Patent: Oct. 18, 2016

(54) SERVO CONTROL DEVICE REDUCING DEFLECTION OF FRONT END POINT OF MACHINE

(71) Applicant: FANUC CORPORATION, Minamitsuru-gun, Yamanashi (JP)

(72) Inventor: Naoto Sonoda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/728,494

(22) Filed: Jun. 2, 2015

(65) Prior Publication Data
US 2015/0355628 A1    Dec. 10, 2015

(30) Foreign Application Priority Data

Jun. 5, 2014  (JP) ................................. 2014-117039

(51) Int. Cl.
| | | |
|---|---|---|
| *H02P 6/00* | (2016.01) | |
| *G05B 19/404* | (2006.01) | |
| *G05B 19/19* | (2006.01) | |

(52) U.S. Cl.
CPC ............. *G05B 19/404* (2013.01); *G05B 19/19* (2013.01); *G05B 2219/41139* (2013.01)

(58) Field of Classification Search
CPC ... G05B 19/19; G05B 19/404; G05B 19/416
USPC ....... 318/560, 561, 571, 574, 575, 596, 611, 318/623, 628, 631, 686, 35, 47, 90, 114, 318/115, 119, 128, 135, 700, 721, 400.01, 318/400.14, 400.15, 432, 268, 779, 799; 73/847; 191/69; 267/26, 154
See application file for complete search history.

(56) References Cited

U.S. PATENT DOCUMENTS

| | | | |
|---|---|---|---|
| 6,184,644 B1 * | 2/2001 | Eguchi ................. | G05B 19/404 318/624 |
| 7,030,585 B2 * | 4/2006 | Iwashita ................ | G05B 19/39 318/560 |

(Continued)

FOREIGN PATENT DOCUMENTS

| | | |
|---|---|---|
| CN | 101727088 A | 6/2010 |
| JP | 2003272328 | 9/2003 |

(Continued)

OTHER PUBLICATIONS

Kim, D., et al., "Full digital controller of permanent magnet AC servo motor for industrial robot and CNC machine tool," Sep. 1994, pp. 1015-1021, vol. 2, Proceedings of 20th International Conference on Industrial Electronics, Control and Instrumentation, IECON '94 (abstract only).

(Continued)

*Primary Examiner* — Antony M Paul
(74) *Attorney, Agent, or Firm* — RatnerPrestia

(57) ABSTRACT

A servo control device having a position control unit and a speed control unit to control a front end point of a machine of a machine tool, comprising: a position detecting unit for detecting a position of a motor; a first position error calculating unit for calculating a first position error based on a position command to a motor and position feedback from the position detecting unit; a torsion estimating unit for estimating an amount of torsion of the front end point of the machine; a second position error calculating unit for adding the first position error and estimated amount of torsion to calculate a second position error; a coefficient adapting unit for determining a coefficient of feedforward control so as to minimize the second position error; and a higher order feedforward control unit for performing feedforward control by using the determined coefficient and the position command.

4 Claims, 9 Drawing Sheets

(56) References Cited

U.S. PATENT DOCUMENTS

| | | |
|---|---|---|
| 8,093,856 B2 | 1/2012 | Miyaji |
| 8,786,219 B2 * | 7/2014 | Ikeda .................. H02P 5/52 242/334.1 |

FOREIGN PATENT DOCUMENTS

| | | |
|---|---|---|
| JP | 2004195616 | 7/2004 |
| JP | 2004213472 | 7/2004 |
| JP | 2006-172149 A | 6/2006 |
| JP | 2010108399 | 5/2010 |
| JP | 2011043952 | 3/2011 |

OTHER PUBLICATIONS

"Improved feedforward FIR vibration controller," Journal of Vibration and Shock vol. 28, No. 2, 2009 (English Abstract) (5 pages).

* cited by examiner

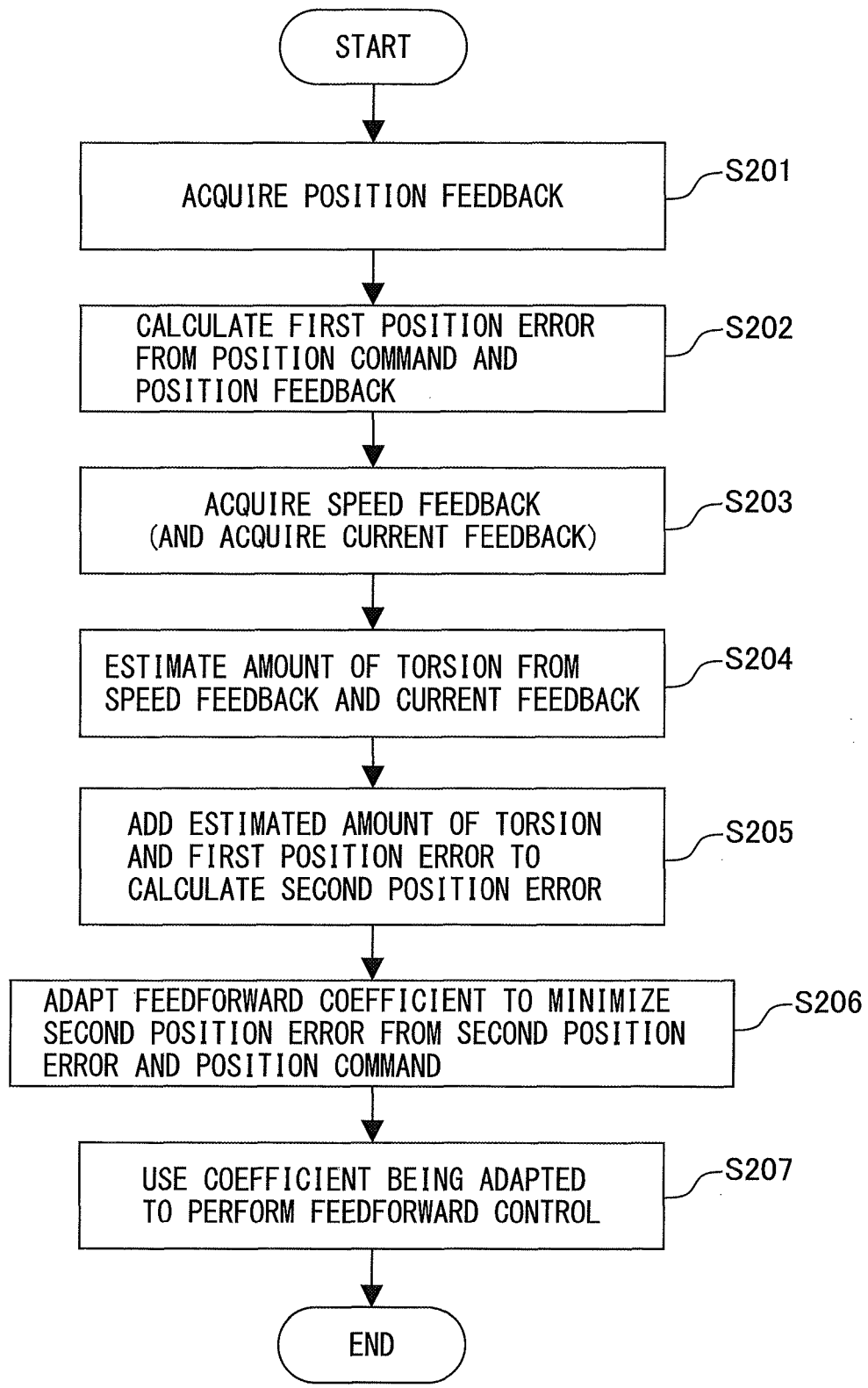

SERVO CONTROL DEVICE REDUCING DEFLECTION OF FRONT END POINT OF MACHINE

BACKGROUND OF THE INVENTION

1. Field of the Invention

The present invention relates to a servo control device which controls a machine tool or other machine which uses a motor, in particular a servo control device which reduces the "deflection" of a processing point when using a tool to process a workpiece, that is, a front end part of the tool (a front end point of the machine), as a driven member which the motor drives.

2. Description of the Related Art

In general machine tools etc., as control systems for axes which are driven by motors, there are semi-closed systems which use detectors which are provided at motors for control and full-closed systems which have separate detectors close to the front end parts of the tools (hereinbelow, referred to as the "front end points of the machines").

In general, due to cost demands, the former semi-closed systems are more frequently used. In such a system, when the rigidities of the motor and the front end point of the machine are low, there is a problem that elastic deformation of the machine causes "deflection" or "torsion" to occur and error arises in the movement of the front end point of the machine with respect to a command.

On the other hand, in machines in which higher precision control is necessary, full-closed systems are used. By arranging a detector near the front end point of a machine, it is possible to reduce the error between the command and movement of the front end point of the machine. However, in general, it is difficult to arrange a detector at the tool front end part or other position close to the front end point of the machine. Even in a full-closed system, there is sometimes error in movement of the front end point of the machine with respect to a command.

As explained above, when the rigidity of the machine is low, not only in a semi-closed system, but also a full-closed system, the "deflection" or "torsion" caused by elastic deformation of the machine sometimes causes error in movement of the front end point of the machine with respect to a command. If such error occurs, the processing precision deteriorates, therefore control is sought which minimizes the error.

In the past, to deal with the "deflection" or "torsion" of the front end point of the machine due to such elastic deformation, two major methods have been proposed. One is the control method using feedback which uses the feedback of a detector of the motor or feedback of an acceleration sensor which can be arranged at a position close to the front end point of the machine so as to estimate movement of the front end point of the machine and uses the results of estimation to control the motor. The other is the control method which uses feedforward to predict the "deflection" or "torsion" from the machine rigidity to correct the commands or the method of restricting acceleration etc. of a command and correcting the command so that no deflection of the front end point of the machine occurs.

For example, the method is known of arranging an acceleration sensor close to the front end point of the machine, estimating the "deflection" or "torsion" of the front end point of the machine from the feedback, and using learning control for control so that the error between the command and movement of the front end point of the machine becomes minimal (for example, refer to Japanese Patent Publication of Un-examined application No. 2006-172149 A). Furthermore, a method has also been disclosed of estimating the "deflection" or "torsion" of the front end point of the machine from the feedback of a detector of a motor without using an acceleration sensor and using learning control for control so that the error between the command and the movement of the front end point of the machine becomes minimum. In this prior art, as the method of reducing the error, learning control is used, therefore in all of the above methods, repetition of commands is required. Therefore, there is a problem that the learning control is not usable with normal commands.

SUMMARY OF THE INVENTION

The present invention has as its object the provision of a servo control device which combines a control method using feedback and a control method using feedforward to thereby reduce "deflection" or "torsion" of a front end point of a machine to reduce error of movement of the front end point of the machine with respect to a command even with normal commands.

The servo control device according to an embodiment of the present invention provides a servo control device which comprises a position control unit and a speed control unit and which controls the position and speed of a motor to control a front end point of the machine of a machine tool, the control device comprising a position detecting unit which detects a position of a driven member which is driven by the motor or a position of the motor, a first position error calculating unit which calculates a first position error from a position command to a motor and position feedback from the position detecting unit, a torsion estimating unit which calculates an amount of torsion of the front end point of the machine, a second position error calculating unit which adds the first position error and estimated amount of torsion to calculate a second position error, a coefficient adapting unit which determines a coefficient of feedforward control so as to minimize the second position error, and a higher order feedforward control unit which uses the determined coefficient and the position command to the motor to perform feedforward control.

According to the servo control device of the embodiment of the present invention, it is possible to arrange an acceleration sensor close to the front end point of the machine, estimate the "deflection" or "torsion" of the front end point of the machine from the feedback, and use the results of estimation and the command which is given to the motor to adaptively determine the coefficient of higher order feedforward control so as to make the "deflection" or "torsion" smaller by using the least square method, the steepest descent method, or other method. This higher order feedforward control acts so as to restrict the acceleration of the command. Consequently, it is possible to decrease the "deflection" or "torsion".

BRIEF DESCRIPTION OF THE DRAWINGS

These and other features and advantages of the present invention will be better understood by reading the following detailed description, taken together with the drawings wherein:

FIG. 7 is a flow chart for explaining an operating procedure of a servo control device according to the second embodiment of the present invention;

DETAILED DESCRIPTION

Figure 1:
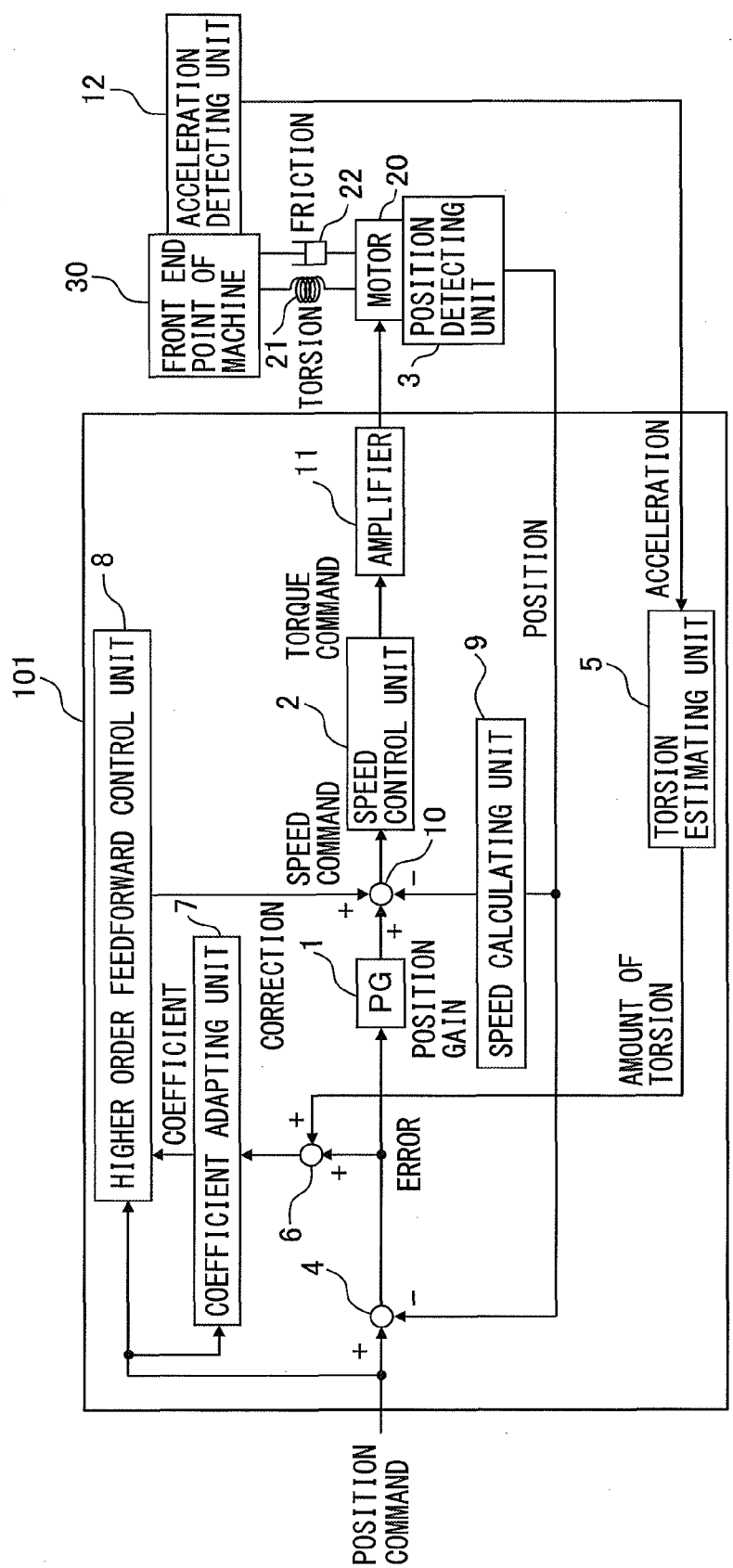
FIG. 1 is a configuration diagram of a servo control device according to a first embodiment of the present invention.

Referring to the drawings, a servo control device according to the present invention will be explained. However, it should be understood that the technical scope of the present invention is not limited to these embodiments and extends to inventions which described in the claims and their equivalents.

First Embodiment

A servo control device according to a first embodiment of the present invention will be explained using the drawings. FIG. 1 is a configuration diagram of a servo control device according to the first embodiment of the present invention. The servo control device 101 according to the first embodiment of the present invention is a control device which is provided with a position control unit 1 and speed control unit 2 and which controls the position and speed of the motor 20 to control the front end point of the machine 30 of a machine tool. The servo control device 101 is provided with a position detecting unit 3, a first position error calculating unit 4, a torsion estimating unit 5, a second position error calculating unit 6, a coefficient adapting unit 7, and a higher order feedforward control unit 8.

The control object, that is, the front end point of the machine 30, is controlled by the motor 20. The torsion 21 and the friction 22 must also be considered. The position detecting unit 3 is provided near the motor 20, detects position of the driven member which is driven by the motor 20 or the position of the motor 20, and outputs this as position feedback to the first position error calculating unit 4.

The first position error calculating unit 4 calculates the first position error from the position command to the motor 20 and the position feedback from the position detecting unit 3.

The torsion estimating unit 5 estimates the amount of torsion of the front end point of the machine 30. The method of calculation of the amount of torsion will be explained later.

The second position error calculating unit 6 adds the first position error and the estimated amount of torsion to calculate the second position error.

The coefficient adapting unit 7 acquires the second position error and uses the acquired second position error and position command to determine the coefficient of higher order feedforward control by using the least square method or steepest descent method or other technique to minimize the second position error.

The higher order feedforward control unit 8 uses the coefficient which is determined by the coefficient adapting unit 7 and the position command to the motor 20 to perform feedforward control. The correction value which is calculated by the higher order feedforward control unit 8 is added by the adder 10 to the position error which the position control unit 1 multiplies with the position gain. The speed feedback which was calculated at the speed calculating unit 9 using the position feedback from the position detecting unit 3 is decreased to calculate the speed command.

The speed control unit 2 obtains the calculated speed command and outputs a torque command to an amplifier 11. The amplifier 11 drives the motor 20 in accordance with the torque command.

Various methods may be considered as the method of estimation of the amount of torsion. In the servo control device according to the first embodiment, an acceleration detecting unit 12 is provided which detects the acceleration of the front end point of the machine 30. The torsion estimating unit 5 estimates the amount of torsion of the front end point of the machine 30 on the basis of the acceleration which is fed back from the acceleration detecting unit 12.

The torsion estimating unit 5 integrates the acceleration feedback which was acquired from the acceleration detecting unit 12 by second-order integration to remove the low frequency component in high pass filtering to thereby estimate the amount of torsion of the front end point of the machine 30.

Figure 2:
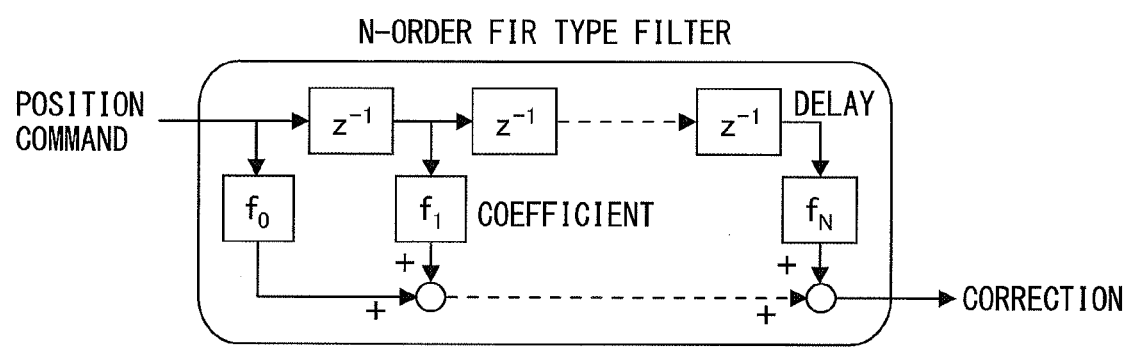
FIG. 2 is a diagram which shows the structure of a higher order feedforward control device which is provided at a servo control device according to the first embodiment of the present invention.

Next, the method of calculation of the coefficient by the coefficient adapting unit 7 will be explained. The higher order feedforward control unit forms an FIR (finite impulse response) type filter structure which has a plurality of coefficients $f_0, f_1, \ldots, f_N$ such as shown in FIG. 2 and is expressed by the following formula:

$$F(z) = f_0 + f_1 * z^{-1} + f_2 * z^{-2} + \ldots + f_N * z^{-N}$$

The coefficient adapting unit performs calculation by the following algorithm when for example using the steepest descent method:

$$f_m(n) = f_m(n-1) + \mu(n) \cdot e(n) \cdot \omega(n-m)$$

where, "f" is a filter coefficient, "e" is error, ω is a command, and "m" is the order of feedforward control from 0 to N.

Further, $\mu(n)$ is an adaptation coefficient which is for example calculated by the following calculation formula:

$$\mu(n) = \frac{\eta}{1 + \omega(n)^2 + \omega(n-1)^2}$$

where, η is a constant.

Note that this calculation is performed every sampling period. The above formula shows the n-th calculation.

The higher order feedforward control unit 8 uses the coefficient which was determined by the coefficient adapting unit 7 in the above way and the position command to the motor to perform feedforward control.

Figure 3:
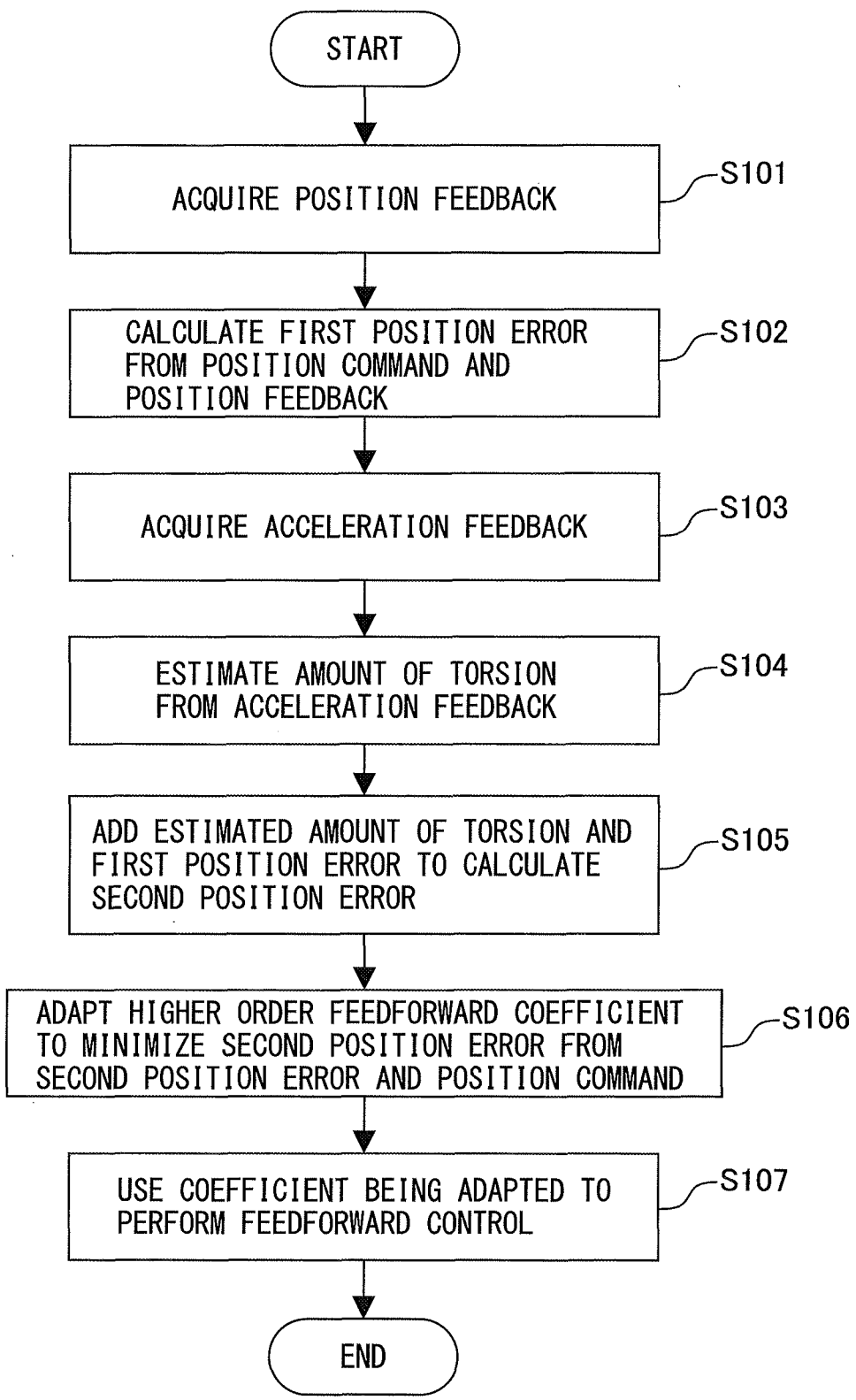
FIG. 3 is a flow chart for explaining an operating procedure of a servo control device according to the first embodiment of the present invention.

Next, the operating procedure of the servo control device according to the first embodiment of the present invention will be explained using the flow chart which is shown in FIG. 3. First, at step S101, the position detecting unit 3 acquires position feedback. The detected position feedback is output to the first position error calculating unit 4.

Next, at step S102, the first position error calculating unit 4 calculates the first position error from the position command to the motor 20 and the position feedback from the position detecting unit 3.

Next, at step S103, the acceleration detecting unit 12 detects the acceleration of the front end point of the machine 30 for feedback to the torsion estimating unit 5. The data of the detected acceleration is output to the torsion estimating unit 5.

Next, at step S104, the torsion estimating unit 5 estimates the amount of torsion of the front end point of the machine 30 on the basis of the acceleration which was fed back from the acceleration detecting unit 12.

Next, at step S105, the second position error calculating unit 6 adds the estimated amount of torsion and the first position error to calculate the second position error.

Next, at step S106, the coefficient adapting unit 7 acquires the second position error and uses the second position error and a position command to determine and adapt the coefficient of higher order feedforward control by using the least square method or steepest descent method or other technique to minimize the second position error.

Next, at step S107, the coefficient being adapted is used to perform feedforward control.

In the above way, the servo control device 101 according to the first embodiment estimates the amount of torsion of the front end point of the machine 30, adds this amount of torsion to the error, and adaptively determines the coefficient of higher order feedforward control so as to minimize the error from the added error and the position command. As a result, it is possible to correct the speed command by feedforward control so as to prevent "deflection" or "torsion" from occurring by adapting a suitable coefficient. With this method, there is an effect that not only can the amount of torsion be decreased, but also the delay in control response can be simultaneously compensated for and as a result there is no longer error in the movement of the front end point of the machine with respect to the position command.

Second Embodiment

Figure 4:
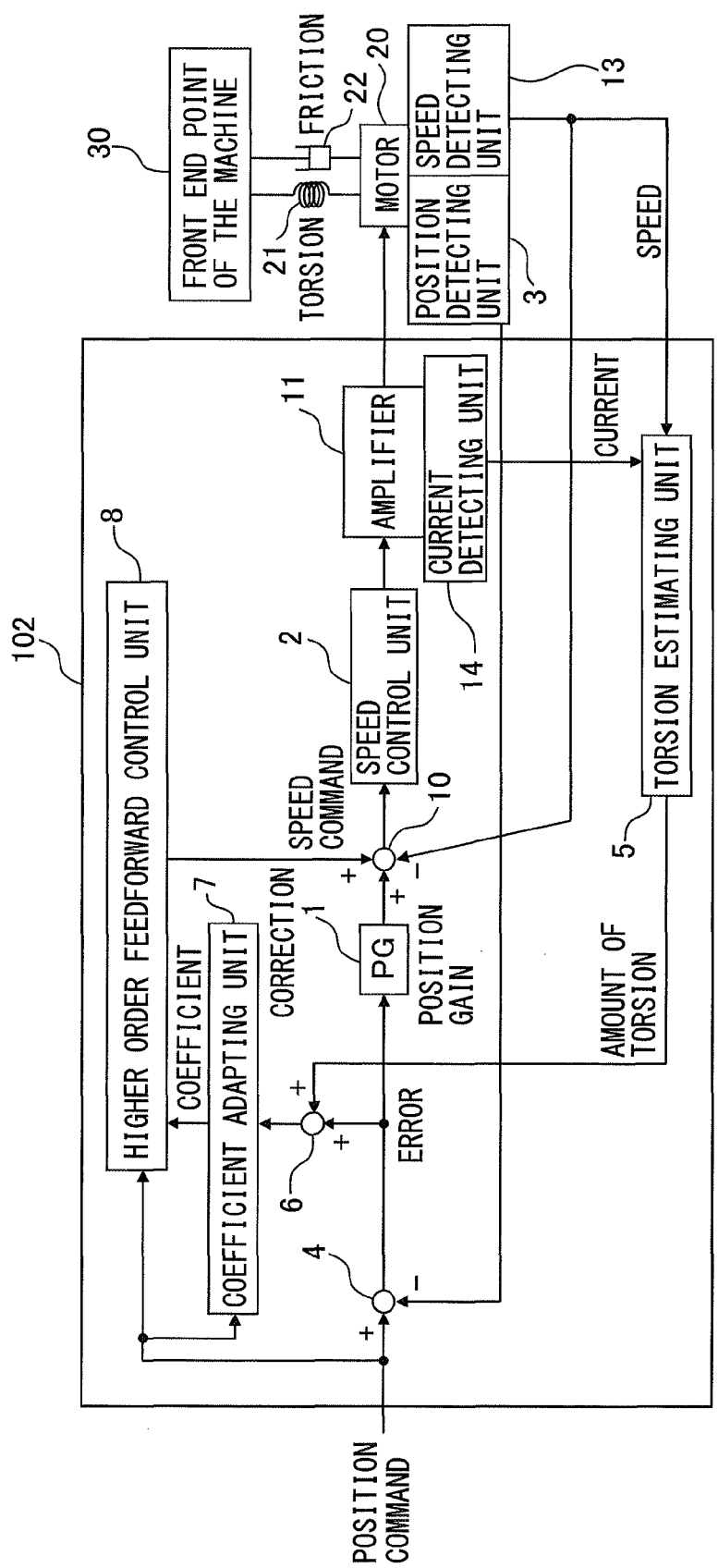
FIG. 4 is a configuration diagram of a servo control device according to a second embodiment of the present invention.

Next, a servo control device according to a second embodiment of the present invention will be explained using the drawings. FIG. 4 is a configuration diagram of a servo control device according to the second embodiment of the present invention. The servo control device 102 according to the second embodiment differs from the servo control device 101 according to the first embodiment on the point of being provided with, instead of the acceleration detecting unit 12, a speed detecting unit 13 which detects the speed of the motor 20 and a current detecting unit 14 which detects the current of the motor 20. The torsion estimating unit 5 estimates the amount of torsion of the front end point of the machine 30 from the speed of the motor 20 and the current of the motor 20. The rest of the configuration of the servo control device 102 according to the second embodiment is similar to the configuration of the servo control device 101 according to the first embodiment, therefore a detailed description will be omitted.

Figure 5:
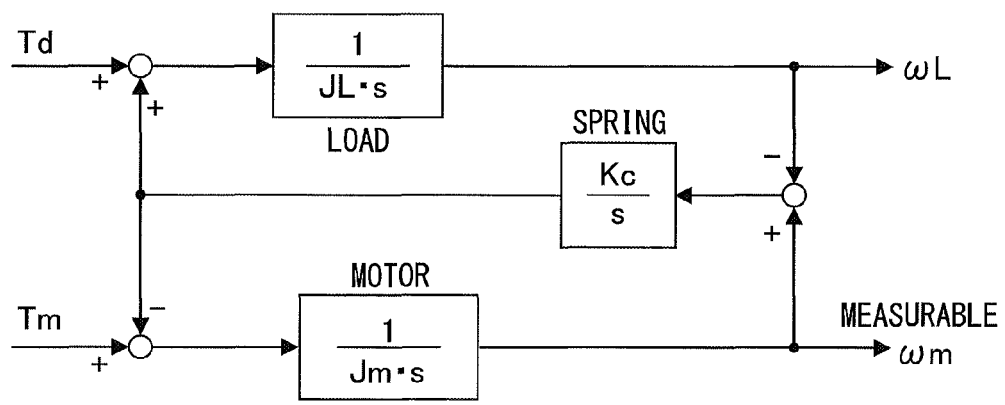
FIG. 5 is a diagram which shows the structure of a torsion estimating unit which is provided at the servo control device according to the second embodiment of the present invention.

In the motor control device according to the second embodiment, the torsion estimating unit 5 estimates the amount of torsion by an algorithm assuming the control object is a two-inertia system such as shown in FIG. 5. The motion equation of the two-inertia mechanical model (friction ignored) is given as follows:

$$\begin{cases} Jm \cdot \omega_m(s) \cdot s = Tm(s) - Kc \cdot (\omega_m(s) - \omega_L(s))/s \\ JL \cdot \omega_L(s) \cdot s = Kc \cdot (\omega_m(s) - \omega_L(s))/s + Td(s) \end{cases}$$

where,
J: inertia;
ω: speed;
Kc: spring constant;
Tm: command torque; and
Td: disturbance torque=0.

Regarding the suffixes "m" and "L" in FIG. 5 and the following formula, "m" indicates the motor side, while "L" indicates the front end point of the machine (load) side.

Therefore,
$\omega_m$: motor speed;
$\omega_L$: speed of front end point of the machine (load);
Jm: motor inertia;
JL: inertia of front end point of machine (load);
θm: motor position; and
θL: position of front end point of machine (load).

The amount of torsion is estimated in the following way.

$$\theta m(s) - \theta L(s) = (\omega_m(s) - \omega_L(s))/s = (Tm(s) - Jm \cdot \omega_m(s) \cdot s)/Kc$$

where, θ indicates the position.

Here, to avoid the differentiation, a low pass filter of the time constant τ is introduced:

$$\theta m(s) - \theta L(s) = (Tm(s) - Jm \cdot \omega_m(s) \cdot s)/Kc/(\tau \cdot s + 1) = Tm(s)/Kc/(\tau \cdot s + 1) - Jm \cdot \omega_m(s)/Kc/\tau \cdot (1 - 1/(\tau \cdot s + 1))$$

The discretization Δθ indicates the amount of torsion and is given by the following formula:

$$\Delta \theta(z) = (Tm(z) \cdot F(z) - Jm \cdot \omega_m(z)/\tau \cdot (1 - F(z)))/Kc$$

where, F(z) is a low pass filter.

Since Tm cannot be observed, the current feedback (torque command) Iq is used. Kt is the torque constant of the motor.

$$\Delta \theta(z) = (Kt \cdot Iq(z) \cdot F(z) - Jm \cdot \omega_m(z)/\tau \cdot (1 - F(z)))/Kc$$

In the second embodiment, in the same way as the first embodiment, the amount of torsion of the front end point of the machine 30 is estimated, this amount of torsion is added to the error, and the coefficient of higher order feedforward control is adaptively determined from the added error and the position command so that the error becomes minimum. As a result, it is possible to correct the speed command by feedforward control so as to prevent "deflection" or "torsion" from occurring by adapting to a suitable coefficient. By this method, it is possible to not only reduce the amount of torsion but also simultaneously compensate for delay in control response. As a result, there is an effect that there is no error in movement of the front end point of the machine with respect to the position command.

Figure 6B:
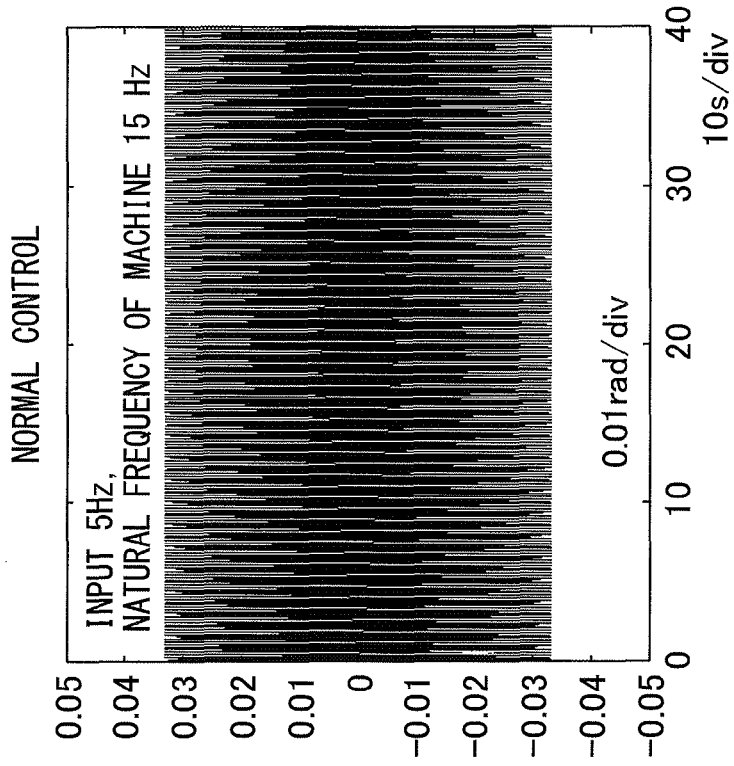
FIG. 6B shows the results of numerical simulation of error between a command and movement of the front end point of the machine when inputting a sine wave command to a servo control device according to the second the second embodiment of the present invention.
Figure 6A:
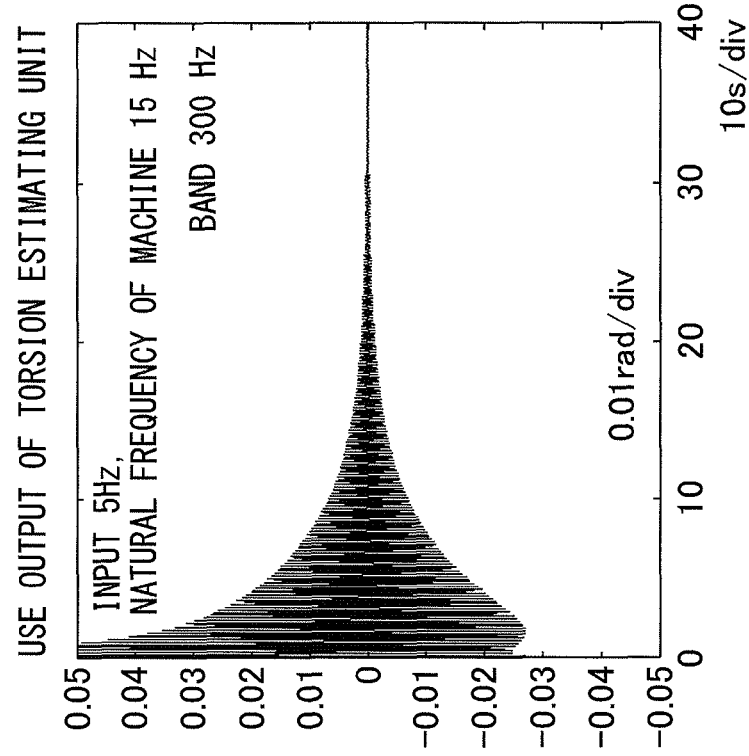
FIG. 6A shows the results of numerical simulation of error between a command and movement of the front end point of the machine when inputting a sine wave command to a servo control device according to normal control.

FIGS. 6A and 6B are graphs of observation by numerical simulation of the error between the command and the movement of the front end point of the machine 30 when inputting a sine wave command of 5 Hz according to normal control and according to the servo control device 102 according to the second embodiment. The natural frequency of the machine is assumed to be 15 Hz. In FIGS. 6A and 6B, the abscissa indicates the time and the ordinate indicates the magnitude of the error (=command−movement of front end point of the machine). As shown in FIG. 6A, in the case of the normal control method, it is not possible to make the error converge. As opposed to this, when using the motor control device 102 according to the second embodiment, if not using the acceleration detecting unit 12 but using the torsion estimating unit, the coefficient of the feedforward control is optimized with the time, therefore it can be confirmed that the error converges.

Next, the operating procedure of the servo control device according to the second embodiment of the present invention 102 will be explained using the flow chart shown in FIG. 7. First, at step S201, the position detecting unit 3 acquires position feedback. The detected position feedback is output to the first position error calculating unit 4.

Next, at step S202, the first position error calculating unit 4 calculates the first position error from the position command to the motor 20 and the position feedback from the position detecting unit 3.

Next, at step S203, the speed detecting unit 13 detects the speed of the motor 20, while the current detecting unit 14 detects the current of the motor 20. The detected speed value and current value are output to the torsion estimating unit 5 as speed feedback and current feedback.

Next, at step S204, the torsion estimating unit 5 estimates the amount of torsion of the front end point of the machine 30 from the speed feedback and the current feedback.

Next, at step S205, the second position error calculating unit 6 adds the estimated amount of torsion and the first position error to calculate the second position error.

Next, at step S206, the coefficient adapting unit 7 acquires the second position error and uses the second position error and the position command to determine and adapt the coefficient of higher order feedforward control by using the least square method or steepest descent method or other technique to minimize the second position error.

Next, at step S207, the coefficient being adapted is used to perform feedforward control.

In the above way, according to the servo control device of the second embodiment, it is not necessary to provide the acceleration detecting unit 12 at the front end point of the machine 30, therefore a simple configuration can be used to estimate the amount of torsion.

Third Embodiment

Figure 8:
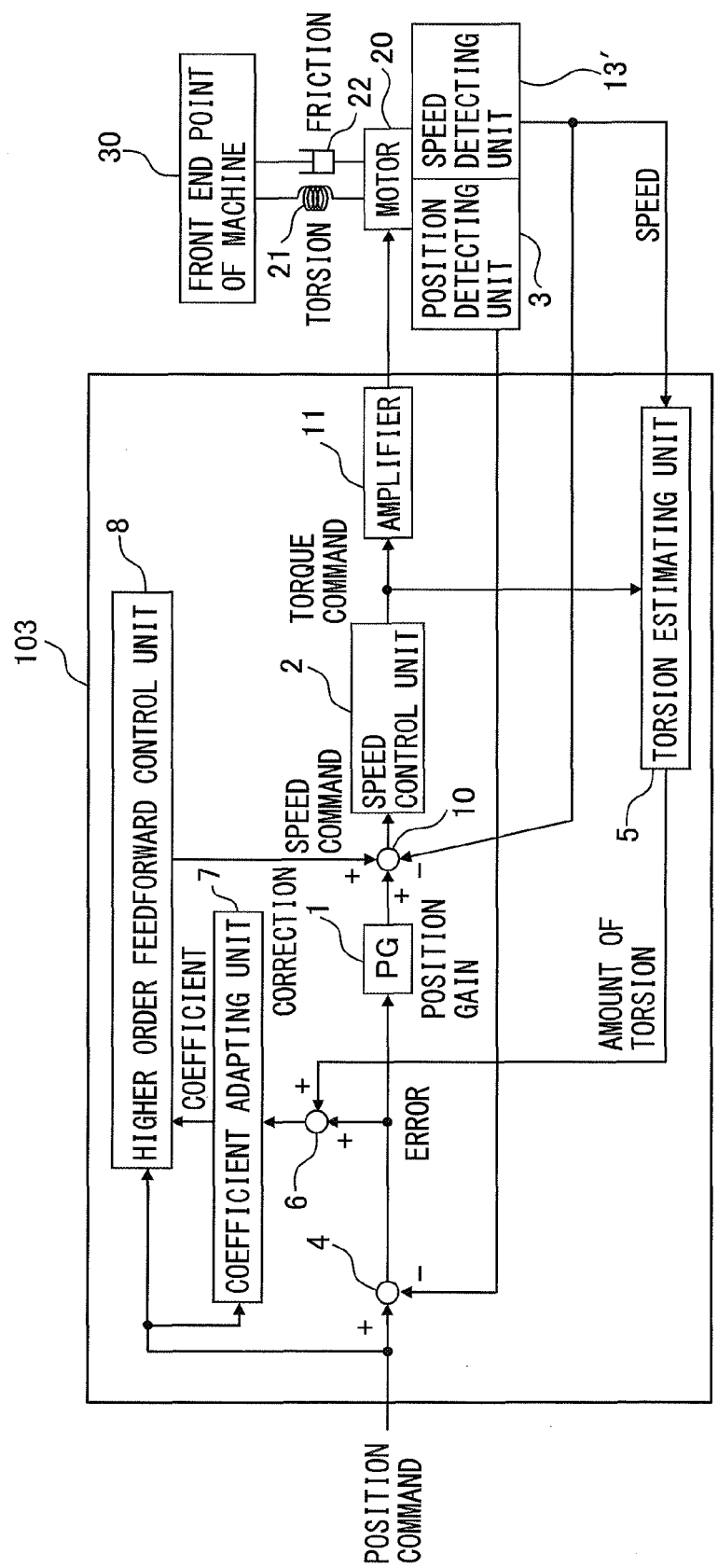
FIG. 8 is a configuration diagram of a servo control device according to a third embodiment of the present invention.

Next, a servo control device 103 according to a third embodiment of the present invention will be explained using the drawings. FIG. 8 is a configuration diagram of a servo control device 103 according to the third embodiment of the present invention. The servo control device 103 according to the third embodiment differs from the servo control device 101 according to the first embodiment on the point of being provided with, instead of the acceleration detecting unit 12, a speed detecting unit 13' which detects the speed of the motor 20 and the torsion estimating unit 5 estimates the amount of torsion of the front end point of the machine 30 from the speed of the motor 20 and the torque command to the motor 20. The rest of the configuration of the servo control device 103 according to the third embodiment is similar to the configuration of the servo control device 101 according to the first embodiment, and therefore a detailed description will be omitted.

Figure 9:
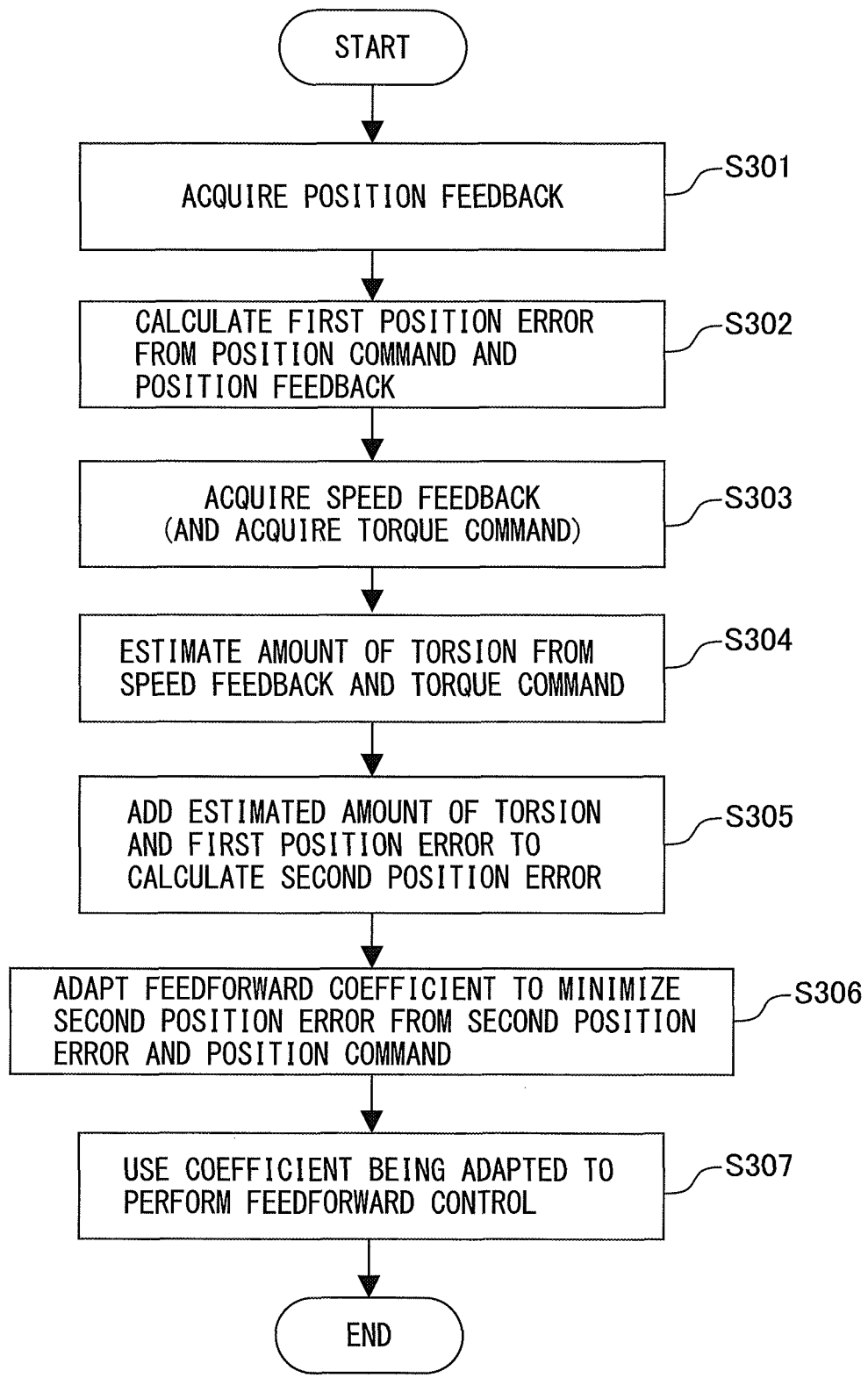
FIG. 9 is a flow chart for explaining an operating procedure of a servo control device according to the third embodiment of the present invention.

Next, the operating procedure of the servo control device according to the third embodiment of the present invention will be explained using the flow chart shown in FIG. 9. First, at step S301, the position detecting unit 3 acquires position feedback. The detected position feedback is output to the first position error calculating unit 4.

Next, at step S302, the first position error calculating unit 4 calculates the first position error from the position command to the motor 20 and the position feedback from the position detecting unit 3.

Next, at step S303, the speed detecting unit 13 detects the speed of the motor 20 for feedback to the torsion estimating unit 5 and the speed control unit 2 outputs a torque command. The detected speed value and the torque command are output to the torsion estimating unit 5.

Next, at step S304, the torsion estimating unit 5 estimates the amount of torsion of the front end point of the machine 30 from the speed feedback and the torque command.

Next, at step S305, the second position error calculating unit 6 adds the estimated amount of torsion and the first position error to calculate the second position error.

Next, at step S306, the coefficient adapting unit 7 acquires the second position error and uses the second position error and a position command to determine and adapt the coefficient of higher order feedforward control by using the least square method or steepest descent method or other technique to minimize the second position error.

Next, at step S307, the coefficient being adapted is used to perform feedforward control.

As explained above, according to the servo control device 103 of the third embodiment, there is no need to provide an acceleration detecting unit 12 at the front end point of the machine 30. Further, there is no need to provide a current detecting unit 14, and therefore it is possible to use a simple configuration to estimate the amount of torsion.

What is claimed is:

1. A servo control device which comprises a position control unit and a speed control unit and which controls the position and speed of a motor to control a front end point of a machine of a machine tool, the control device comprising:
a position detecting unit configured to detect a position of a driven member which is driven by the motor or the motor;
a first position error calculating unit configured to calculate a first position error on the basis of a position command to a motor and position feedback from said position detecting unit;
a torsion estimating unit configured to estimate an amount of torsion of the front end point of the machine;
a second position error calculating unit configured to add said first position error and estimated amount of torsion to calculate a second position error;
a coefficient adapting unit configured to determine a coefficient of feedforward control so as to minimize said second position error; and
a higher order feedforward control unit configured to perform the feedforward control by using said determined coefficient and the position command to the motor.

2. The servo control device according to claim 1 further comprising an acceleration detecting unit configured to detect acceleration of the front end point of the machine, wherein said torsion estimating unit estimates an amount of torsion of the front end point of the machine on the basis of the acceleration which is fed back from said acceleration detecting unit.

3. The servo control device according to claim 1 further comprising:
   a speed detecting unit configured to detect a speed of the motor; and
   a current detecting unit configured to detect a current of the motor,
   wherein said torsion estimating unit estimates an amount of torsion of the front end point of the machine on the basis of the speed of said motor and current of said motor.

4. The servo control device according to claim 1 further comprising a speed detecting unit configured to detect a speed of the motor,
   wherein said torsion estimating unit estimates an amount of torsion of the front end point of the machine on the basis of the speed of said motor and torque command to said motor.

* * * * *